US007835932B2

(12) United States Patent  
Minsky et al.

(10) Patent No.: US 7,835,932 B2
(45) Date of Patent: Nov. 16, 2010

(54) RELATIONAL LOGIC MANAGEMENT SYSTEM

(75) Inventors: Steven Minsky, Boston, MA (US); Charles Forgy, Pittsburgh, PA (US); Ming Tan, Newton, MA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 12/234,122

(22) Filed: Sep. 19, 2008

(65) Prior Publication Data

US 2009/0106063 A1    Apr. 23, 2009

Related U.S. Application Data

(62) Division of application No. 10/861,777, filed on Jun. 4, 2004, now Pat. No. 7,428,519.

(60) Provisional application No. 60/475,674, filed on Jun. 4, 2003.

(51) Int. Cl.
*G06F 9/44* (2006.01)
(52) U.S. Cl. ...................................................... 705/7
(58) Field of Classification Search .................. 705/7
See application file for complete search history.

(56) References Cited

U.S. PATENT DOCUMENTS

| 5,406,477 A | 4/1995 | Harhen |
| 5,485,616 A | 1/1996 | Burke et al. |
| 5,706,452 A | 1/1998 | Ivanov |
| 5,799,297 A * | 8/1998 | Goodridge et al. ............. 707/1 |
| 5,802,508 A | 9/1998 | Morgenstern |
| 5,890,130 A | 3/1999 | Cox et al. |
| 5,920,861 A | 7/1999 | Hall et al. |
| 5,960,404 A | 9/1999 | Chaar et al. |
| 6,009,405 A | 12/1999 | Leymann et al. |
| 6,225,998 B1 | 5/2001 | Okita et al. |
| 6,401,111 B1 | 6/2002 | Dan et al. |
| 6,473,748 B1 * | 10/2002 | Archer ........................ 706/45 |
| 6,631,271 B1 | 10/2003 | Logan |
| 6,662,172 B1 | 12/2003 | Smith |
| 6,789,054 B1 | 9/2004 | Makhlouf |
| 6,807,583 B2 | 10/2004 | Hrischuk et al. |

(Continued)

OTHER PUBLICATIONS

Model-driven integration of software and service components by Zhao, Wei, Ph.D., The University of Alabama at Birmingham, 2006, 254 pages; AAT 3253670.*

(Continued)

*Primary Examiner*—Beth V Boswell
*Assistant Examiner*—Luis Santiago
(74) *Attorney, Agent, or Firm*—Mintz, Levin, Cohn, Ferris, Glovsky and Popeo, P.C.

(57) ABSTRACT

In one aspect, the invention relates to a method to propagate relations between a first rule set and a second rule set wherein the first and second rule sets are invoked by a common workflow model. The method includes tracing paths forward through the workflow model from the first rule set to the second rule set. Enumerating relations that extend forward from the first rule set to the second rule set is another step in the method. Additionally, using multi-valued logic, calculating the effects to the relations of control flow through the workflow model from the first rule set to the second rule set, tracing paths backward through the workflow model from the first rule set to the second rule set, enumerating relations that extend backward form the second rule set to the first rule set, and using multi-valued logic, calculating the effects on the relations of control flow backwards through the workflow model from the second rule set to the first rule set are also steps in the method.

17 Claims, 13 Drawing Sheets

U.S. PATENT DOCUMENTS

| | | | |
|---|---|---|---|
| 6,952,690 B2 * | 10/2005 | Lumpp et al. | 706/47 |
| 6,993,514 B2 * | 1/2006 | Majoor | 706/47 |
| 7,165,105 B2 | 1/2007 | Reiner et al. | |
| 7,222,302 B2 | 5/2007 | Hauser et al. | |
| 2003/0065541 A1 * | 4/2003 | Menninger | 705/7 |
| 2005/0097187 A1 * | 5/2005 | Thompson et al. | 709/217 |

OTHER PUBLICATIONS

Simulation based optimization for supply chain configuration design:by Truong, Tu Hoang, Ph.D., Kansas State University, 2002, 137 pages; AAT 3076123.*

Certified English Summary of Japanese document entitled "Xupper II, A tool by Ken System Consulting That Vastly Improves Task Definition / Logic Design Processes", Gekkan Solution IT, Ric Telecom Co., Jun. 1, 2003, vol. 15, No. 6, pp. 22-25.

Certified English Summary of Japanese document entitled "Blaze Advisor: Configured from Three Components", SunWorld, GDI Japan Inc., Dec. 1, 1999, vol. 9, No. 12, p. 108.

Definition of deadlock patterns for business processes workflow models, Onoda, S.; Ikkai, Y.; Kobayashi, T.; Komoda, N.; *System Sciences* 1999. HICSS-32. Proceedings of the 32$^{nd}$ Annual Hawaii International Conference on Volume Tracks, Jan. 5-8, 1999, pp. 11 pp. Digital Object Identifier 10.1109/HICSS.1999.772966.

* cited by examiner

◈ Ruleset
Name: Determine Rate
Narrative: [i][b][u][✓][@][@][Black▼]

Determine rate is where the customer's rate is set depending on the customer's type of loan and credit rating

| Rules | Rule Procedures |

| Name | Description |
|---|---|
| conforming | Classify the loan as a conforming loan |
| nonconforming | Classify the loan as a non-conforming loan |
| setCredit | Determine credit rating for applicants with high |
| goodCredit | Set rate for good credit |
| mediumCredit | Set rate for medium credit |
| ClassifyLoan | Classify the type of loan. |
| badCredit | Set rate for bad credit |

Rule Viewer
Up
Down
Add
Duplicate Rule
Edit...
Verify Rules...
Check Coverage...
Delete Ok  Cancel  Help

FIG. 4A

Rule Comparison

Status: collision
Rule: conforming

```
IF
(A.requestedLoanAmount <300000.0)
THEN
(
process.theProduct.productType="
Conforming";)
```

Rule: nonconforming

```
IF
(a.requestedLoanAmount >300000.0)
THEN
(
process.theProduct.productType="
Conforming";)
```

Close | Help

Rule Analysis

| Status | Rule 1 | Rule 2 |
|---|---|---|
| collision | conforming | nonconforming |
| collision | conforming | ClassifyLoan |
| overlapping and collision | nonconforming | ClassifyLoan |
| redundant | goodCredit | mediumCredit |
| conflict | goodCredit | badCredit |
| conflict | mediumCredit | badCredit |

View... | Close | Help

FIG. 4B

| Business Logic Category | Examples | Description |
|---|---|---|
| Computation Rule Sets | Carry out calculations about a business concept<br>Compute total dollar amount for an order | Arithmetic operations<br>Aggregate operations |
| Assessment Rule Sets — Eligibility | Characterize a situation in terms of a fixed set of conclusions<br>Determine risk of loan application<br>Determine scholarship money for student | Tests conditions related to a set of criteria for each possible outcome |
| Constraint Rule Sets — Validation | Verify input information about a business concept<br>Validate customer<br>Determine if ordered item is valid | Check for missing information<br>Check for formatting<br>Check for relationships among info. |
| Assignment Rule Sets | Create a mapping between business concepts<br>Assign available planes to open gates<br>Assign qualified agents to collision claims | Tests constraints about mapping<br>Tests preferences about mapping |
| Activity | ○ Get a credit report from a service<br>○ Get a customer record from a database | Statement expressing circumstances that lead to the execution of an action. |
| Sequencing of Activities | ○ Route an application for approval<br>○ Get title insurance, verify employment, and check credit in parallel and wait for conclusion | Statement expressing circumstances that lead to choosing the path to an activity. |
| Monitoring of Activities | Decisions about ongoing process or behavior<br>Check flight passenger behavior over 1 week<br>Check stock trader behavior over 30 days | Test conditions related to patterns of behavior, out-of-range acceptable values, timeframes |

Figure 8

RELATIONAL LOGIC MANAGEMENT SYSTEM

CROSS-REFERENCE TO RELATED APPLICATIONS

This application is a divisional of U.S. patent application Ser. No. 10/861,777 filed on Jun. 4, 2004, now U.S. Pat. No. 7,428,519 which in turn claims the benefits of and priority to provisional U.S. Provisional Patent Application Ser. No. 60/475,674 filed on Jun. 4, 2003, the disclosures of which are hereby incorporated herein by reference in their entirety.

FIELD OF THE INVENTION

This invention relates to business management in general, and specifically to the management of systems that include multiple interacting processes and rule sets.

BACKGROUND OF THE INVENTION

Large enterprises are complex environments, made up of thousands of processes focused on the efficient delivery of goods and services. If any of these business processes are insufficient to meet the changing needs of the business, the result can be higher costs, lower customer satisfaction, and missed opportunities to generate incremental revenues and increased profits.

Companies address this challenge through a combination of automated and manual processes. Automated business applications were initially introduced to handle routine processes. Application developers attempt to manage complexity by delivering multiple, separate applications, creating discrete functional islands with limited integration that continue to restrict business agility. The traditional method of hard coding business information into these applications sometimes proves inflexible for handling the full range of complexity and flexibility needed for business solutions. Additionally, the high cost of maintaining and updating such business information hard coded within applications adds to the cost of missed business opportunities when every business change requires an IT development project.

A challenge for dynamic companies is choosing a system designed to handle all aspects of highly complex business process. Software called Business Process Management Systems (BPMS) has been developed in recent years to enable companies to build and maintain complex enterprise-wide process management systems. At a minimum, a BPMS must contain both a structured workflow engine and a business rules engine. In general, the overall control flow of a company's business process is captured in a structured workflow model, while complex decision-making components of the process are captured in formal business rules. Control flow describes the steps by which a business process is regulated at different stages in a process or model.

Programs have been developed in the past to analyze business components implemented using formal business rules. These programs are generally limited to analyzing one set of rules at a time. As a result these programs have limited usefulness when they are applied to business processes implemented using a BPMS, because a system implemented using a BPMS will typically contain multiple sets of rules, and these rule sets will often involve complex interactions.

A need therefore exists for systems and methods that allow for processing and reconciling multiple interrelated rule sets and business processes. Additionally, a need exists for systems and methods that allow business analysts and professionals to express the policies, tasks, rules and objectives in a format that allows interoperability with existing business procedures and automated systems without cumbersome coding requirements.

SUMMARY OF THE INVENTION

Prior to discussing the aspects of the Relational Logic Management System (RLMS) in detail, an introduction to some of the characteristic terminology used herein may prove informative. However, the scope of the terms discussed herein is not intended to be limiting, but rather to clarify their usage and incorporate the broadest meaning of the terms as known to those of ordinary skill in the art. Specifically, some of the terms that are summarized herein include workflow, control flow, business logic, relationship, information, relational information, and meta-information.

A workflow includes the procedural steps, in which two or more business units (or individuals), collectively share, manage, and operate on information. A workflow includes a series of tasks executed in a specific sequence. As a result of the execution of these tasks, a result desired by the business is achieved. This allows the flow of work between individuals and/or departments to be defined and tracked. Consequently, a company's workflow typically includes multiple users and stages.

A workflow can be a graphic representation of the flow of work and its related components; including specific work processes, information dependencies used when performing the work, and the sequence of decisions and activities. A workflow may define where inputs are required, the location of decision nodes and the alternative branches in output paths. A workflow facilitates the tracking of the flow of work between individuals and/or departments as well as providing the basic description of the work to be done. As such, a workflow can be generally characterized by a graph incorporating lines, branches, nodes, and functional blocks in one embodiment.

Control flow describes the steps by which a business process is regulated at different stages in the process. In one embodiment, control flow describes various restrictions in a larger workflow, such as the requirement that one process step be completed before the next task may start. A control flow can be defined in terms of if, then, and else statements that, in turn, describe how, when and by whom steps can be performed based upon logical relationships.

Business logic also includes the use of symbols and expressions to represent quantities, relationships, arguments, decisions and other concepts in order to express ideas relating to a business. Additionally, business logic relates to any business relevant representation and/or information such that conclusions may be derived from one or more inputs. Typically, these inputs relate to a business' tasks, processes, and work product. In one aspect, business logic includes, but is not limited to at least one of the following: a workflow, a business rule, and a routing rule.

A relationship or relation describes a link or connection between two elements that, in part, is based upon at least one attribute associated with a given element. Furthermore, a relationship is an association, or connection, that can be concrete, abstract, existing or possible, between elements of the same or a different set, that characterizes the interaction of the elements. Additionally, the relationship between one or more elements describes their individual dependence upon each other, their mutual interdependence, and/or their lack of dependence. The type and basis for the connection between two elements and the individual elements themselves are unlimited.

Some exemplary elements can include, but are not limited to rules, variables, processes, workflow components, projects, tasks, and business units. Other suitable elements between which relationships may exist are described throughout this application.

Relationships can enumerate how different elements are related to each other. For example, some elements may have a many-to-many relationship, a many-to-one relationship, a one-to-many relationship, a one-to-one relationship, or combinations thereof. In other examples, elements may share a cause and effect relationship. Various other relationships between different elements are discussed throughout the application.

In part, the term information is used to describe some form of data that is capable of communication and use. Information is a representation of knowledge. As such, information includes, but is not limited to facts, suppositions, or content in any media or form. Suitable forms of information include but are not limited to text, numbers, variables, graphics, images, auditory signals and combinations thereof. Relational information communicates something about the relationship between one or more elements.

Meta-information is defined indirectly with respect to some underlying content. Thus, meta-information is second order information, as such it is information about information. In the context of a document, the identity of the author, or when the manuscript was first written are both meta-information, in contrast with the informational content of a document itself.

The Relational Management System includes various aspects and particular embodiments. In one aspect, the invention relates to a method to propagate relations between a first rule set and a second rule set wherein the first and second rule sets are invoked by a common workflow model. The method includes tracing paths forward through the workflow model from the first rule set to the second rule set. Enumerating relations that extend forward from the first rule set to the second rule set is another step in the method. Additionally, using multi-valued logic, calculating the effects on the relations of control flow through the workflow model from the first rule set to the second rule set is another step in the method. Thus, the method can operate in a forward direction.

In one embodiment, the method also includes the steps of tracing paths backward through the workflow model from the second rule set to the first rule set, enumerating relations that extend backward from the second rule set to the first rule set, and using multi-valued logic, calculating the effects on the relations of control flow backwards through the workflow model from the second rule set to the first rule set. Accordingly, in one embodiment the method can operate in a forward direction, a backward direction or a combination of both.

In one embodiment, the method includes creating flow graphs for the ordinary procedural code embedded in the workflow model, propagating relations between the nodes in the flow graphs. In another embodiment, the method includes creating flow graphs for the business rules embedded in the workflow model, propagating relations between the nodes in the flow graphs. In yet another embodiment, the multi-valued logic is a two-valued logic.

In another aspect, the invention relates to a method for storing at least one sequence of workflow steps and rule sets in memory such that the reuse of the at least one sequence is facilitated. The method includes storing the sequence, and storing relational information computed for each variable used in the sequence, wherein the relational information remains accessible to an operator to facilitate sequence reuse.

In one embodiment of the method, the sequence includes meta-information. In another embodiment of the method, the sequence has one input and one output. In yet another embodiment of the method, the relational information is accessible through an interface. In still another embodiment of the method, the sequence is arranged based upon a hierarchy.

In another aspect the invention relates to a method for inserting a sequence of workflow steps into a business process model. The method includes comparing the relational information stored for each variable in the sequence to the relational information computed for the business process model, creating computer initialization instructions to initialize each variable in the sequence, and inserting the computer initialization instructions into the business process model such that the computer initialization instructions will be executed before the sequence of workflow steps.

In one embodiment, the method further includes the steps of creating computer finalization instructions to finalize the sequence by converting the values of the variables in the sequence into a form that can be used by the business process model, and inserting the computer finalization instructions into the business process model such that the computer finalization instructions will be executed after the sequence of workflow steps. In another embodiment, the business process model is a sub-process.

In yet another aspect the invention relates to a relational logic management system. The system includes a modeler adapted for generating business logic, at least one repository for storing business logic generated by the modeler; and at least two rule sets. The modeler includes at least one logical component. Additionally, the relationships between rule set elements are determinable using a bi-directional comparative process.

In one embodiment of the system, the business logic includes at least one workflow. In another embodiment, the system further includes at least one code generator adapted for generating code in response to the modeler. In yet another embodiment, the system further includes at least one code executor for receiving code from the code generator and executing a portion of the code. In still another embodiment of the system, the modeler includes a graphical user interface. In an additional embodiment of the system each rule set includes at least one rule. In a further embodiment of the system at least one rule set includes a pattern matching rule. In one embodiment, a pattern matching rule is a rule that uses one or more patterns to describe the data that it operates on, relying on the rule engine to locate the correct data at run time. Non-pattern matching rules use named variables to specify the data they operate on.

In still another aspect, the invention relates to a system for analyzing a business process model. The system includes a first rule set that includes at least one rule and a second rule set that includes at least one rule. Additionally, the system includes a workflow defining at least a portion of the business process model, a means for identifying rule parameters; and an interface means for modifying the workflow.

In one embodiment of the system, the workflow includes reusable logical sequences. In another embodiment of the system, the means for identifying rule parameters detects dependency relationships among rules by input and output parameters. In yet another embodiment of the system, the interface means comprises a graphical user interface. In still another embodiment of the system, the workflow includes at least one path and at least one node.

In another aspect, the invention relates to a method for propagating relations between a first business parameter and a second business parameter wherein the first and second business parameters are invoked by a common workflow model. The method includes tracing paths along a first direction through the workflow model from the first business parameter to the second business parameter, enumerating relations that extend along the first direction from the first the business parameter to the second business parameter, using multi-valued logic, calculating the effects on the relations of control flow through the workflow model from the first business parameter to the second business parameter. In one embodiment, the method also includes the steps of tracing paths along a second direction through the workflow model from the second business parameter to the first business parameter, enumerating relations that extend along the second direction from the second business parameter to the first business parameter, and using multi-valued logic, calculating the effects on the relations of control flow along the second direction through the workflow model from the second business parameter to the first business parameter. In one embodiment, each business parameter is chosen from a group consisting of a workflow, a rule set, and a rule. In one embodiment, the first direction is forward direction. In another embodiment, the first direction is a backward direction.

In one aspect of the invention, the RLT component can (1) propagate information forward and backward through the workflow, taking into account the multiple paths that may be followed through the workflow, and (2) work with meta-information about a process, including constraints on terms and definitions of terms, thereby allowing the RLT component to perform a semantic as well as syntactic analysis of the business logic.

In another aspect, the invention includes a method for facilitating the reuse of existing fragments or modules of business logic in new contexts. Units of reuse in the RLMS are sequences of workflow steps, rule sets, or both, with a number of properties. The properties allow the RLMS to automate many of the steps involved in adapting a sequence for reuse in a new environment.

Other features and advantages of the invention will become apparent from the following detailed description and drawings.

BRIEF DESCRIPTION OF DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 4A and 4B are graphic user interface representations of rule information according to an illustrative embodiment of the invention;

FIG. 8 is a table illustrating various exemplary business logic categories suitable for use in an embodiment of the invention;

DETAILED DESCRIPTION

The presently preferred and alternative embodiments of the invention, including the best mode for practicing the invention known at this time, are now described in detail in connection with the accompanying drawings. It is, however, expressly noted that the present invention is not limited to these embodiments, but rather the intention is that modifications that are apparent to the person skilled in the art and equivalents thereof are also included.

The invention includes aspects of a new system, referred to here as a Relational Logic Management System (RLMS), which is, in part, an enhanced Business Process Management Systems. The RLMS provides a modeling environment, execution environment, and logic repository to capture, manage, analyze, distribute and execute business logic. The analysis component of the RLMS is referred to as the relational logic technology (RLT) component of the RLMS. Combining an advanced rules engine and a sophisticated business process management system results in an efficiently integrated approach that allows business analysts to model, test, optimize, and analyze an existing business. This integrated approach represents one aspect of the invention.

The RLT component addresses a number of issues, including the problems that result from different rule sets using conflicting terminology. RLT understands and integrates with individual rule sets and the workflow that incorporates the individual rule sets. RLT component typically includes analytical and visualization features. These are used to ensure accuracy, consistency and completeness in business process design. Aspects of the invention further support these goals by providing visual feedback about logic errors, incomplete or inconsistent rules and defective workflows. This enables changes that can meet new business needs and respond to user feedback. The ability to analyze an entire, complex business process with multiple rule sets across multiple workflow steps, within a department or across an enterprise provides many advantages to business analysts. These aspects of the invention and others are discussed in more detail below.

Figure 1:
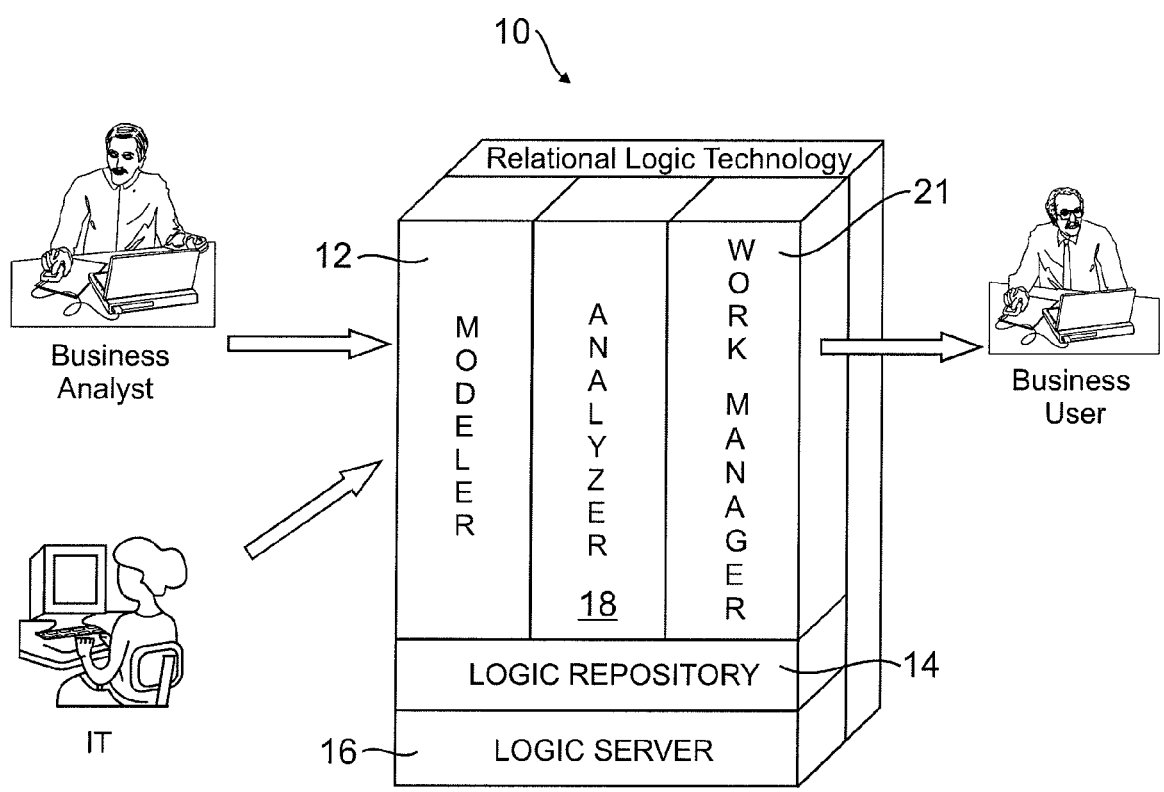
FIG. 1 is a schematic diagram of a RLMS according to an illustrative embodiment of the invention.
Figure 2:
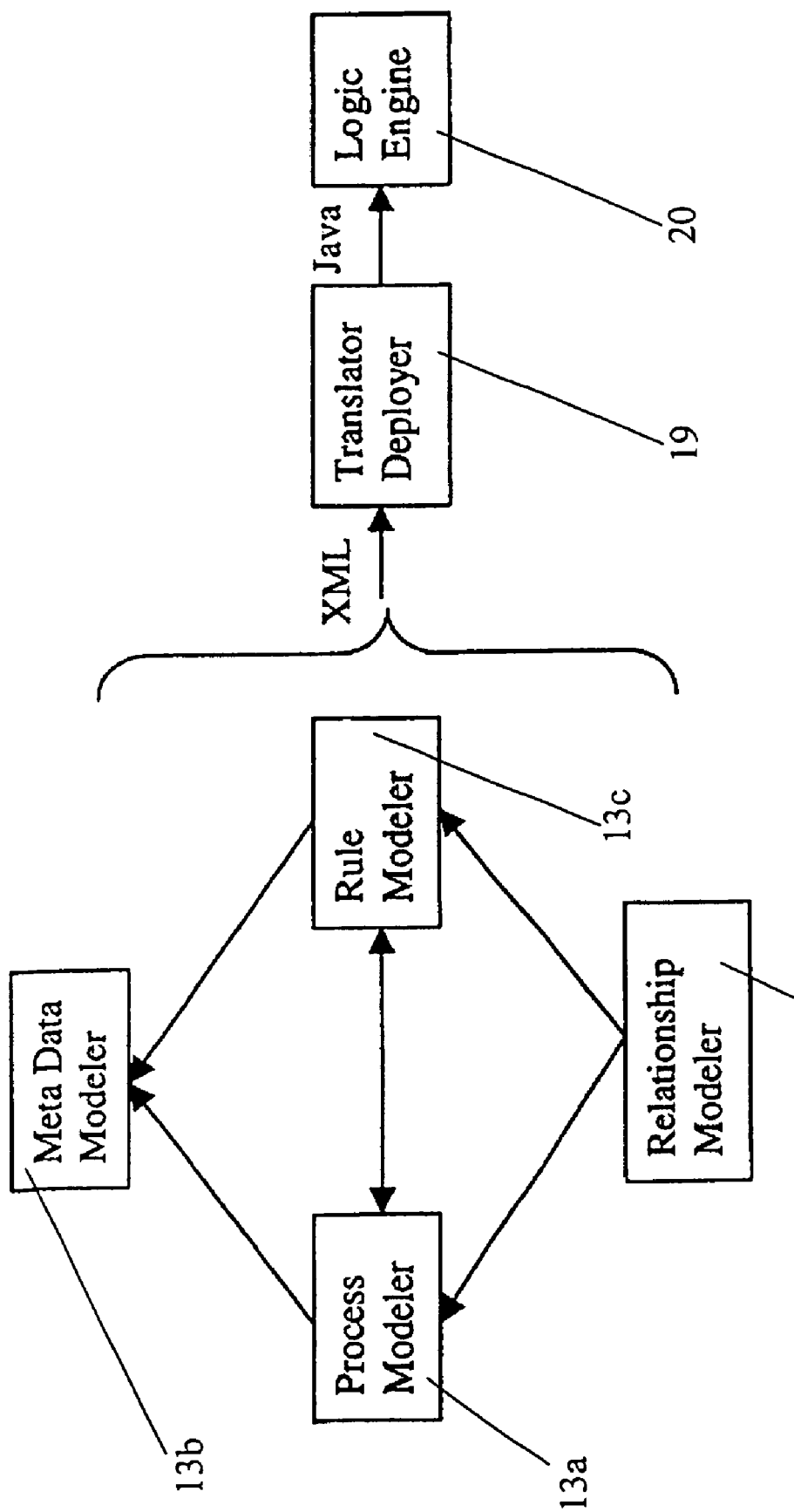
FIG. 2 is a schematic block diagram showing a relationship among modelers and a logic engine according to an illustrative embodiment of the invention.

Referring to FIG. 1, the RLMS system 10 includes a modeler 12 for business analysts and information technology (IT) staff to model and generate business logic. Modeler 12 has several logical components. An exemplary modeler with different exemplary logical components is shown in FIG. 2. An exemplary modeler can include a process modeler 13a, a meta-data modeler 13b, a rule modeler 13c, and/or a relationship modeler 13d in one embodiment. However, in another embodiment the modeler includes one or more generalized logical components capable of modeling elements and information typical for a given business application.

After the logic is modeled, it is stored in a logic repository 14. The system generates code, in one embodiment Java code, for decision support and workflow business logic. This code is executed by a logic server 16, which is a robust and scalable environment for executing code for the rules and processes defined by modeler 12. The server 16 can automatically prompt application software and users when a business process needs to be completed. Additionally, it can track progression, monitor performance, and maintain a comprehensive historical audit trail. The logic server 16 can be based on rule engines that employ industry-standard RETE or enhanced RETE matchers. An exemplary RETE algorithm suitable for use in one embodiment of the invention is disclosed in Charles L. Forgy's "RETE: A fast algorithm for the many pattern/many object pattern match problem", Artificial Intelligence 19(1):17-37, September 1982, the disclosures of which are herein incorporated by reference in their entirety. However, the logic server 16 can include other logical engines or enterprise system components. The analyzer 18 shown uses the relational logic technology to examine and characterize the business model once it has been finalized by a user or at an intermediate stage in the development of the business model.

Although multiple repositories are possible, the RLMS preferably has a single common repository 14 for the storage and management of business logic. As also indicated in FIG. 2, the logic from the modelers can be represented in an XML-based format, allowing it to be quickly moved between the RLMS and other business applications. However, in other embodiments the logic can be expressed according to any suitable format, protocol, or programming language. Because the logic is represented in a common format, it provides a coherent view of business logic across the enterprise. A translator deployer 19 can be used to transfer or convert XML or another suitable format for use by a logic engine 20 such as the RETE engine. An optional work manager 21 can also be incorporated in some embodiments of the RLMS that provides task management capabilities to enable collaboration between operations staff members, business management, and other company employees.

Modeler 12 typically uses a graphical, drag-and-drop interface for allowing a user to create a workflow. However, any suitable interface for communicating information to the modeler can be used. In some embodiments, a workflow is represented by functional blocks interconnected by branches. An exemplary workflow incorporating a graphic user interface (GUI) is shown in FIG. 3A.

Figure 3A:
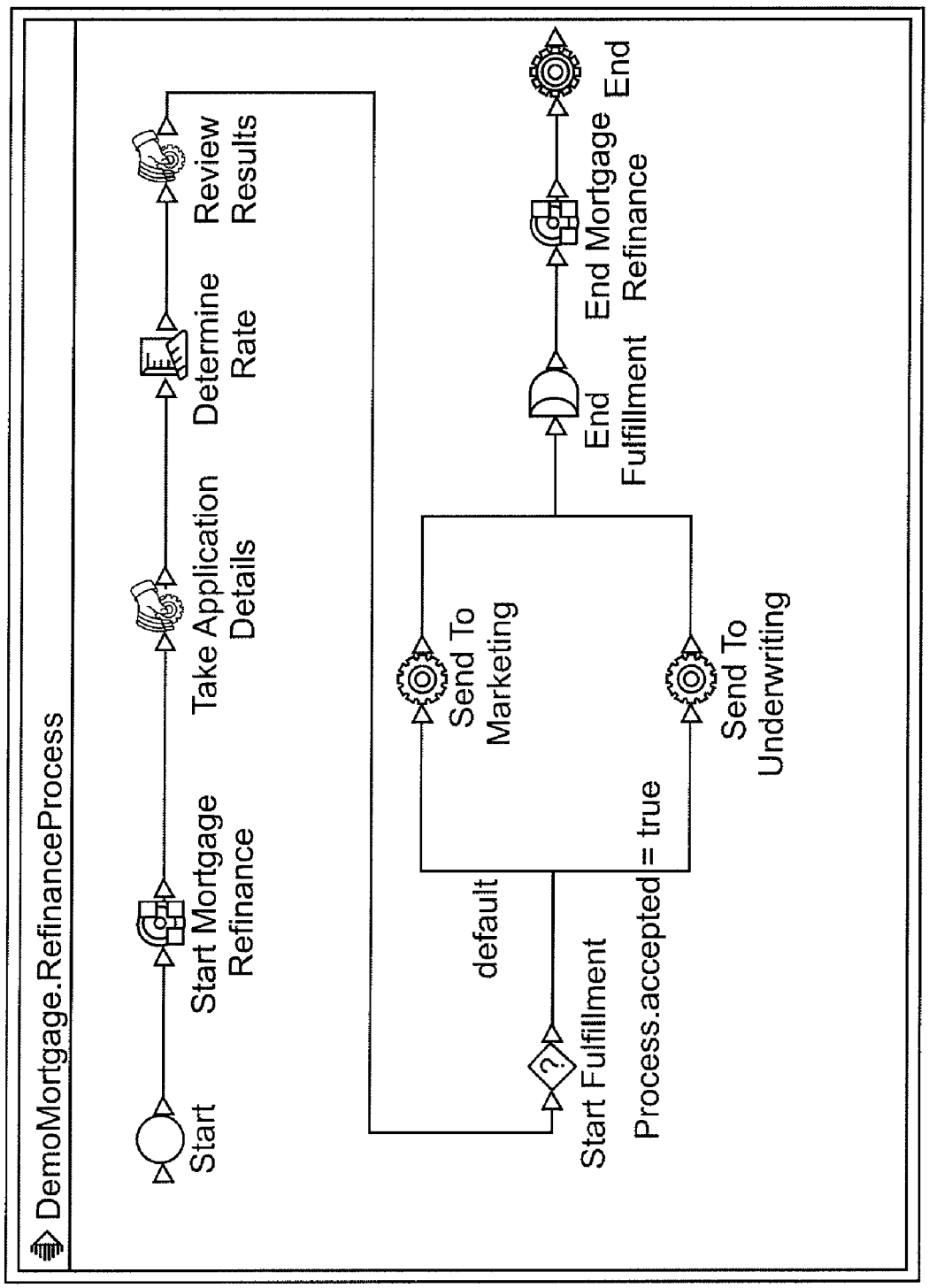
FIGS. 3A and 3B are schematic diagrams of modeler component of the RLMS according to an illustrative embodiment of the invention.

The workflow shown in FIG. 3A illustrates how a business process, such as for example a mortgage refinancing process can be represented. The graphical representation shown corresponds to one embodiment of the modeler portion of the RLMS introduced with respect to FIG. 2. However, whereas a typical word-processing or organizational charting program generates static graphics, the modeler is an intelligent and evolving tool. A series of blocks, as shown in FIG. 3A, corresponding to different processes can be connected together by branches and nodes. This collection of connecting flow lines, branches and nodes is typically referred to as a graph. Information passes between the different input and outputs. Additionally, different rule sets can be defined for some or all of the blocks to control the flow of information and data. Both manual and automatic processes can be modeled using the RLMS. Once the model is complete, different aspects of the RLMS can be used to analyze the rules and describe their interactions based, in part, upon the linkages shown in the workflow. Additionally, current, historic or simulated data can be introduced to test the model or evaluate a particular business operation.

Figure 3B:
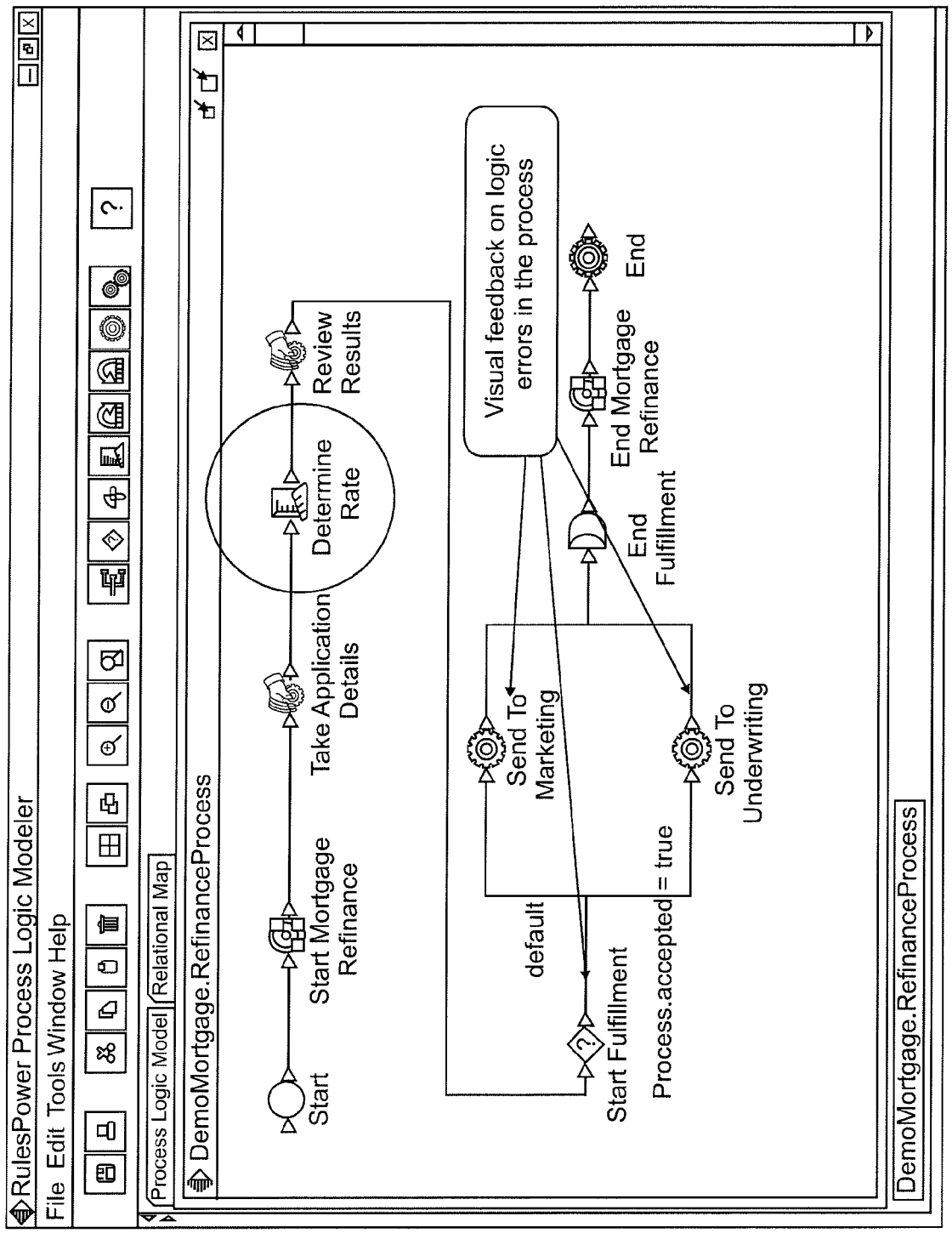

As an example of a conflicting rules problem that RLT is designed to solve, consider two rules that could be used by a mortgage lending organization. An exemplary workflow relating to this example is shown in FIG. 3B. The workflow embodiment in the modeler shows a sales division having a business rule that states that a buyer must have a down payment of at least 5% of the property value. The mortgage fulfillment division might have a business rule that no mortgage can be issued for more than 90% of the value of the property. These rules are reasonable in isolation, but they have a gap and are thus in conflict.

Existing systems would typically not find this conflict, however, for two reasons. First, the rules are in different rule sets—the first in the rule set is used by the sales department and the second in the rule set is used by the fulfillment department. These two rule sets are linked only because both are part of the same overall business process. However, both exemplary rules are executed at different stages of the process. Second, the rules use different terminology: "down payment" amount versus "mortgage." To identify the conflict, the system would have to know the relation between the terms "down payment," "mortgage," and "property value."

The RLMS is capable of recognizing the conflict between the two mortgage rate rules. Thus, a business analyst receives instant, visual feedback about logic errors, incomplete or inconsistent rules and incorrect workflows. In this instance, the visual feedback is shown by the stylized exclamation points in this exemplary embodiment in FIG. 3B. Further, as a result of the GUI interface incorporated in embodiments of the RLMS system, clicking on the visual feedback indicator allows for more detail about the error message and access to different portions of the system. As shown in FIGS. 4A and 4B, the GUI allows for the conflicting rules in FIG. 3B's workflow to be explored in more detail. However, the conflict illustrated in FIGS. 4A and 4B relates to a collision between two different rules.

In particular, FIGS. 4A and 4B illustrate and expands some of the information associated with the Determine Rate block of FIGS. 3A and 3B. In FIG. 4A, the rules associated with the Determine Rate block are shown. While in FIG. 4B, a rule analysis and rule comparison window are shown that illustrate the specific nature of the colliding rules, as well as the particular If, Then logical relation describing the rules. Thus, comprehensive analysis of a business model is possible that includes incompleteness, unused variables, violations of global priority or formula rules, or many types of conflicts within rules. As such, a business analyst could adjust the rules or change the workflow to improve the process of mortgage financing for the company. The flexible nature of the rules modeling and the workflows allows for quick changes and precise business modeling.

Workflows can include processes that need to be done, choices, loops, and other forms of branching, each of which is represented by an icon. Once a process, choice, or other option is selected, the user can define the processes or rules for that choice. This aspect of the modeler allows business professionals with no experience in programming or symbolic operations to create a working representation of a particular business unit or process.

Some of the blocks used to assemble the workflow logically expand into multiple components. For example, a two-way split is a branch at one end and a logical exclusive-or (XOR) at the other end after the branches have come together. In the branching portion, the user can identify the rules that will govern the branching. An example of this is shown in FIGS. 3A and 3B at the Start Fulfillment block. For example, if a variable has a first value, the flow branches in one direction, and if it has a second value, then in a second direction; for example, invoices that are received may be routed differently depending on the value of a variable representing the amount or a variable representing the department that is being billed. In FIGS. 3A and 3B, the default rule is for the information present at the start of fulfillment process to be sent to marketing. However, if the application process has resulted in an acceptance of the application, the information is sent on to underwriting.

Within a process block, the system can have one, several, or many rules that operate on the inputs, potentially taking the place of many branching steps and reducing the complexity of the flow. Thus, large complex inefficient tasks can be combined to form discrete process blocks in the workflow.

The use of graphical user interfaces and drag-and-drop systems for defining workflows, and automatically generating code, simplify the rules analysis and business modeling process. In the modeler according to an embodiment of the present invention, however, the components of the workflow are well defined and constrained to a relatively small number of specific function types. The user does not enter lines between steps to show the flow between steps, but can drop a process or block between two other processes, in which case the lines, and hence flow, between them will be established automatically. To create alternative paths, the user can select splits or choices to create a block with multiple branches. This constrained system can limit some of the flows that could be made, such as flow between branches, but the flows that would not be possible in this system are ones that would less likely be used, and could be represented in other ways. By keeping a constrained set of options in some embodiments, more efficient results and model creation can be obtained.

Figure 5:
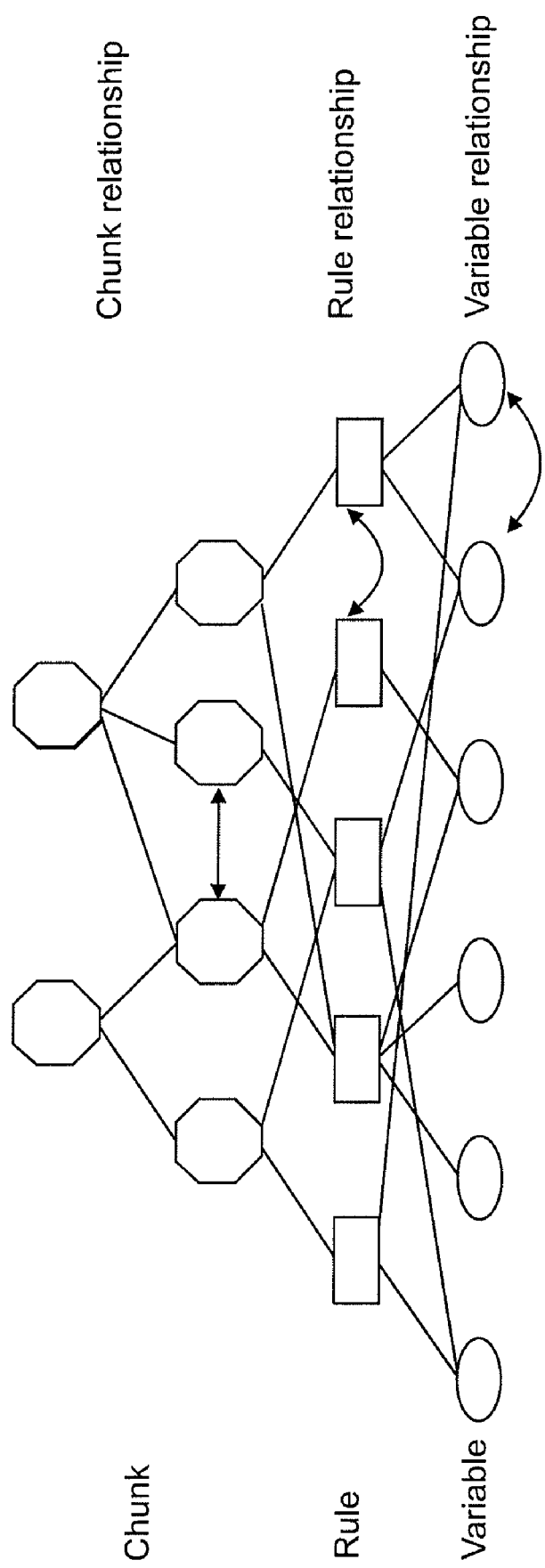
FIG. 5 is a schematic diagram illustrating an exemplary rule management hierarchy according to an illustrative embodiment of the invention.

The relational logic management platform is built upon rules, and essentially uses the rules as its underlying language. The relationship modeler supports relational logic modeling (e.g., analyzing the dependency between activities), and also provides a conceptual layer for runtime execution (e.g., transaction management). As shown in FIG. 5, relationship management can have at least three levels: variables, rules, and logical sequences of information referred to as chunks. Generally, a "chunk" is a piece or sequence of information that is reusable by a component of the RLMS. A sequence of logic with workflow steps and/or rule sets, and properties can be a specific type of chunk in one embodiment. The concept and benefits of chunking are discussed in more below.

Figure 6:
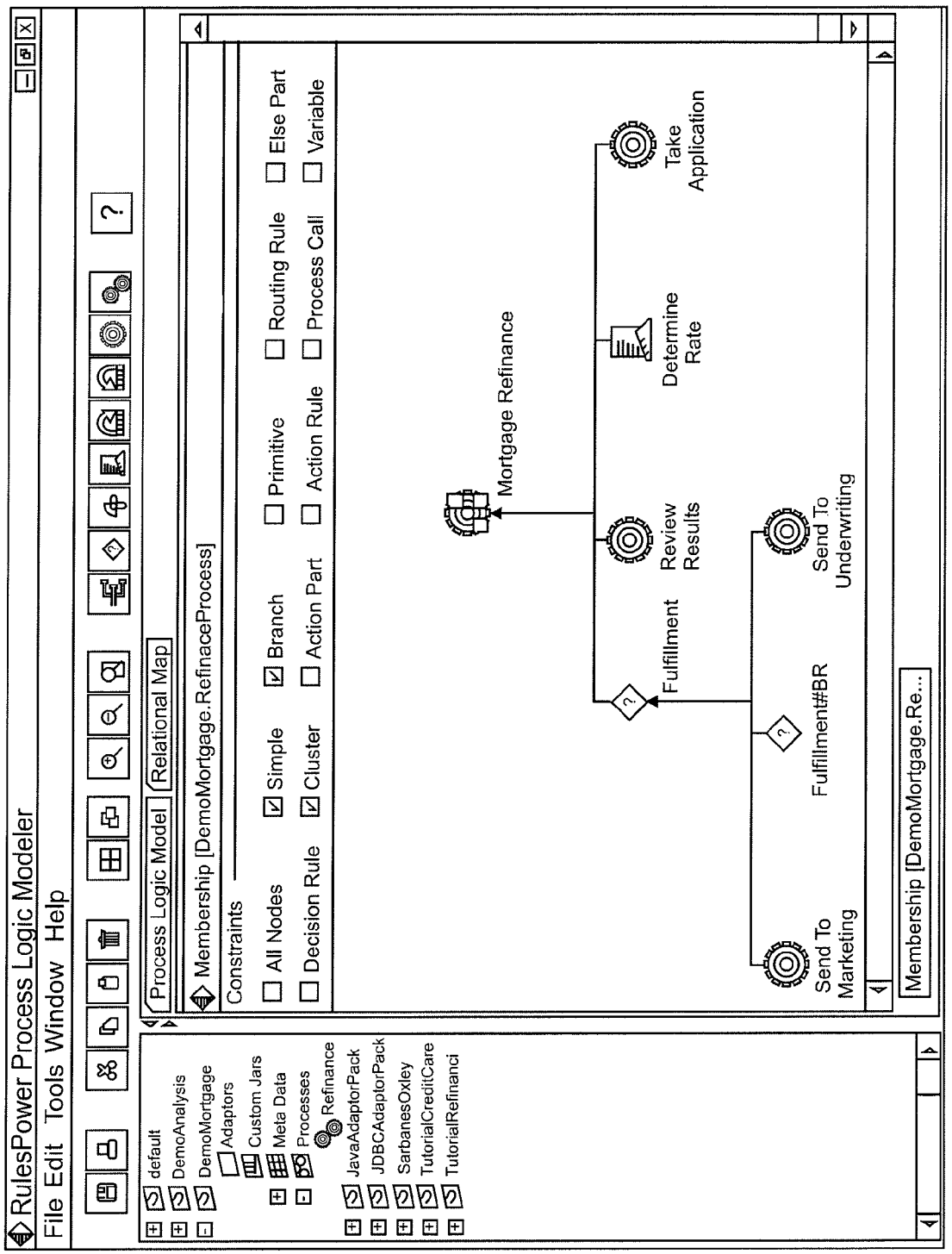
FIG. 6 is a relational map diagram illustrating a portion of a business model according to an illustrative embodiment of the invention.

In general, different features and functionalities can be associated with a given relationship modeler embodiment. A relationship modeler can define the relationships in the different relationship management levels and represent the relationships diagrammatically as shown in FIGS. 3A and 3B. Alternatively, a relational map can be used to visualize the model organized in different hierarchical levels as shown in FIG. 6. The relational map in FIG. 6 corresponds to a portion of the model described by FIGS. 3A-4B. The relational map provides a view of relationships between rules, workflows and variables that helps trace the potential impact of changes.

Showing and managing relationships at different levels, such as at the process flow level and at the activity level to allow users to navigate the hierarchy with zoom-in and zoom-out operations is another aspect of a relationship modeler. Further, a given relationship modeler can derive dependency relationships among rules and chunks. This derivation process can be based on the input parameters of a chunk, analyzed upstream to determine if any input parameters need to be defined first. Finding implicit dependency relationships among rules defined by the input and output parameters of rules is also within the scope of the modeler's feature set.

Utilizing the established relationships, the modeler can perform impact analysis for rule and process modifications. For any modified rule or process step, it shows all other affected steps and rules and the possible impacts due to modification.

Relationship management can play a role at both the modeling stage and run stage. During the modeling stage, relationship management can perform various functions. Certain exemplary functions include, but are not limited to chunk/rule dependency analysis (input dependency, change management); variable constant value change management; constraint validation; conflict detection; and "what if" impact analysis. Similarly during the run stage, the relationship management system can perform functions that include, but are not limited to variable constant value change management; constraint validation; and conflict detection.

The Relational Logic Technology system locates and analyzes relations between all the components of a business process, including variables, workflow steps, individual rules, groups of rules, complete rule sets, and even user-defined groupings of workflow steps and rule sets. Relations can be deduced automatically by the RLT code, they can be supplied by the user, and they can be proposed by the RLT code and approved or disapproved by the user.

This analysis of relations is useful at multiple times during the lifetime of a business process. At process modeling time, the RLT can be used (1) to perform syntactic and semantic analyses of the process to locate problems in the business logic, (2) to perform impact analysis of proposed changes to the logic, and (3) to perform what-if analysis of the logic to determine what the system would do in specific situations. At runtime, the information created by the RLT can be used to monitor the process so that variables can be monitored, constraints can be enforced, and statistics can be captured. At debug time, the information created by the RLT can be used to help the programmer to understand the system's underlying behavior.

The RLT system has several useful characteristics: (1) a common model to represent both formal business rules and structured workflow at design and maintenance time, (2) a common execution platform for both formal business rules and structured workflow, and (3) computer code that implements a calculus of relations. The common model for both rules and workflow permits the RLT computer code to operate on both rules and workflow, finding relations not only between two rule sets, but also between two workflow steps and between rules and workflow steps. For example, if a variable is set in a workflow step and is used in a subsequent rule set, the RLT code can recognize and handle the relation between the two sets of rules.

The common execution platform permits the RLT to operate at runtime on both rules and workflow. For example, the system can identify a constraint violation at runtime regardless of whether the constraint is violated by a rule or by a workflow step. RLT identifies rule conflicts, ambiguity, inconsistencies, overlap, redundancy, and completeness as well as enforcement of priority and formula relationships within and across complete processes. Additionally, applications of RLT also can detect dependencies and relationships between rules, workflows, and their variables, within and throughout a process.

The RLT, according to one embodiment of the invention, preferably includes at least one of the following four functions:

(1) extracting relations from both the workflow steps and the business rules in the combined model;
(2) propagating the relations rule to rule, from rule set to rule set, from workflow step to workflow step, and between workflow steps and rules;
(3) recognizing semantic errors that are uncovered by the relations at design time; and
(4) monitoring the execution of a workflow and business rule process at runtime to collect runtime statistics as well as to catch runtime violations of constraints.

The overall RLMS and the relational logic technology component use rules to define part of the control flow throughout a given process, sub-process, or an overall workflow. Rules use variables and constants as their data items. Together, they make up the context environment for a given rule. Each constant can have a name, a type, and a value, which is defined declaratively. The value of a variable can be changed in run time (e.g., modified through a rule). Each variable can have a name, a type, an initial value and a privilege criterion. However, other characteristics can be associated with a given variable in different embodiments.

Rules typically have an If portion and a Then portion (with an Else portion being an optional rule portion). Boolean portions such as AND and OR can also be incorporated within a rule. Thus, two specific exemplary interrelated rules for a company's credit procedures could be written as follows:

```
IF
    Credit.Rating = A
THEN
    Customer is PlatinumCustomer
IF
    Customer is PlatinumCustomer
AND
    Home.Equity.Loan.Value greater than $200,000
THEN
    Insurance.Premium.Discount is $100
```

The "if" part of the rule contains conditions and the "then" part of the rule contains actions. This format for rule encoding is also illustrated above with respect to FIG. 4B. However, since the rules engine embodiments selected for used with the RLMS use logic written in a common format, any type of rules based encoding format can be used, as long as it is used consistently throughout the RLMS.

Meta-data can also be defined for a particular rule. The metadata for a rule may include:
Classification: a List of (Attribute Value) Pairs Used to Classify a Specific Rule
 Jurisdiction: a list of (attribute value) pairs used to identify an organization where the rule will be applied
 InputParameters: the context data used in the rule
 OutputParameters: the context data changed by the rule
 Any extensions (e.g., capturing rule relationships)

There is a many-to-many relationship between rules and variables, i.e., each rule can have many variables, and each variable can be used in many rules. However, other more limited relationships between rules are variables are also possible. The vertical relationships between variables and rules can be captured for efficient query. For example, when a variable's value is changed, the system can find all the rules that use the variable.

Propagation generally refers to exploring the interrelationship between a particular workflow's constituent elements in order to analyze and more fully understand the overall workflow and its components. Propagation can be used to test business data by introducing the data into an applicable model prepared using the techniques discussed above. Alternatively, propagation can be used to check for rule conflicts, redundancies, or overlaps. In a preferred embodiment, the RLT system can identify and analyze various classes of relationships. Some exemplary relationships, that can be used within or analyzed by the RLMS include, but are not limited to membership, variable, rule, and rule group relationship. Additionally, hierarchical taxonomy, organization structure, semantic network, logical dependency, temporal, and input/output relationships can also be identified and analyzed. Thus, these types of relations between variables, rules, processes, workflow steps, and other elements of the RLMS can be used to model aspects of a business and streamline its operation.

A membership relationship describes how elements of the RLMS are used and/or categorized. The membership of variable can be identified in various ways. A variable can be used in a rule. A variable can be used in the condition of a rule. A variable can be used in the action of a rule. A variable can be used in the both condition and action of a rule. A variable can be used in a routing condition. A variable can be used in a workflow step. A given rule can belong to a rule group or a rule set. Alternatively, a particular rule may be uniquely defined.

In addition to the membership relation of different elements, the specific functional aspects of the variable relationship can be defined and used to specify rules, model processes, and optimize a given model. A variable can be a Boolean function of other variables. A variable can be a qualitative function of other variables. A variable can be a quantitative function of other variables. The characteristics and functional qualities of a given variable can be defined as necessary for any business operation. Propagating relationships between multiple rule sets for a given common workflow model is another aspect of the RLMS.

Propagating relations between rule sets can be a function of various rule parameters and definitions as established by the rules engine. The rules engine can provide the criteria that define conflicts, collisions, subsuming events, impacts, unreachability conditions and incompleteness for two or more rules. Some exemplary rule interaction criteria are as follows:

A rule is in conflict with another rule if two rules have equivalent conditions and different actions,
A rule is in collision with another rule if the two rules have different conditions and equivalent actions.
A rule subsumes another rule if the first rule is more general than the second rule in their conditions. For example, Rule] has a condition (A and B) and $Rule_2$ has a condition (A), $Rule_2$ subsumes $Rule_1$.
A rule overlaps another rule if the conditions of the two rules are satisfied by some, but not all, of the same data.
A rule is semantically equivalent to another rule if the two rules have equivalent conditions and actions.
A rule impacts another rule if the action of the first rule has an impact on the second rule.
For example, if $Rule_1$ uses a variable that is defined in $Rule_2$, $Rule_2$ impacts $Rule_2$.
A rule is unreachable if the other rules cannot create a situation in which the condition part of the rule is satisfied.
A group of rules is incomplete if the conditions of the rules cover some but not all of the situations that can occur.

Generally, a rule group (a rule set) can be evaluated and propagated using the same techniques applied to a given rule. Accordingly, the rules engine can provide the criteria that define the nature of the interactions between rule groups. Some exemplary rule group interaction criteria are as follows:

A rule group is overlapped with another rule group if they share some rules.

A rule group is independent of another rule group if they do not share any rules.

A rule group impacts another rule group if a rule in the first group impacts a rule in the second group.

A rule group is conflict with another rule group if a rule in the first group is in conflict with a rule in the second group.

A rule group is collision with another rule group if a rule in the first group is in collision with a rule in the second group.

In addition, to the categories of relationships discussed above, various other categories are possible in different embodiments. The RLMS can employ hierarchical taxonomy that reflects the classification of a given variable, rule, rule group, and/or workflow step. An organization structure relationship can also be used that denotes a jurisdiction for a given variable, rule, rule group, and/or workflow step. A semantic network that denotes the meaning and interrelation between variables, rules, rule groups, and workflows steps can also be established. The logical dependency amongst different propagation elements, such as truth maintenance can serve to define a relationship category. Further, in an example, wherein A depends from both B and C, this dependence can also serve as a relationship category. Finally, the temporal relationship and an Input/Output relationship can be used when propagating relations between variables, rules, rule groups, and workflows steps. Some of these features can be graphically illustrated using different relational maps to facilitate analysis of business processes.

Other relationship categories known to those of skill in the art can be used in different embodiments. Each relation is identified and handled in a way that is consistent with its meaning. A programmer with reasonable skill in the art can write code to identify and analyze many of these relationships. The rest of the relations can be specified explicitly by the users of the RLMS.

Figure 7:
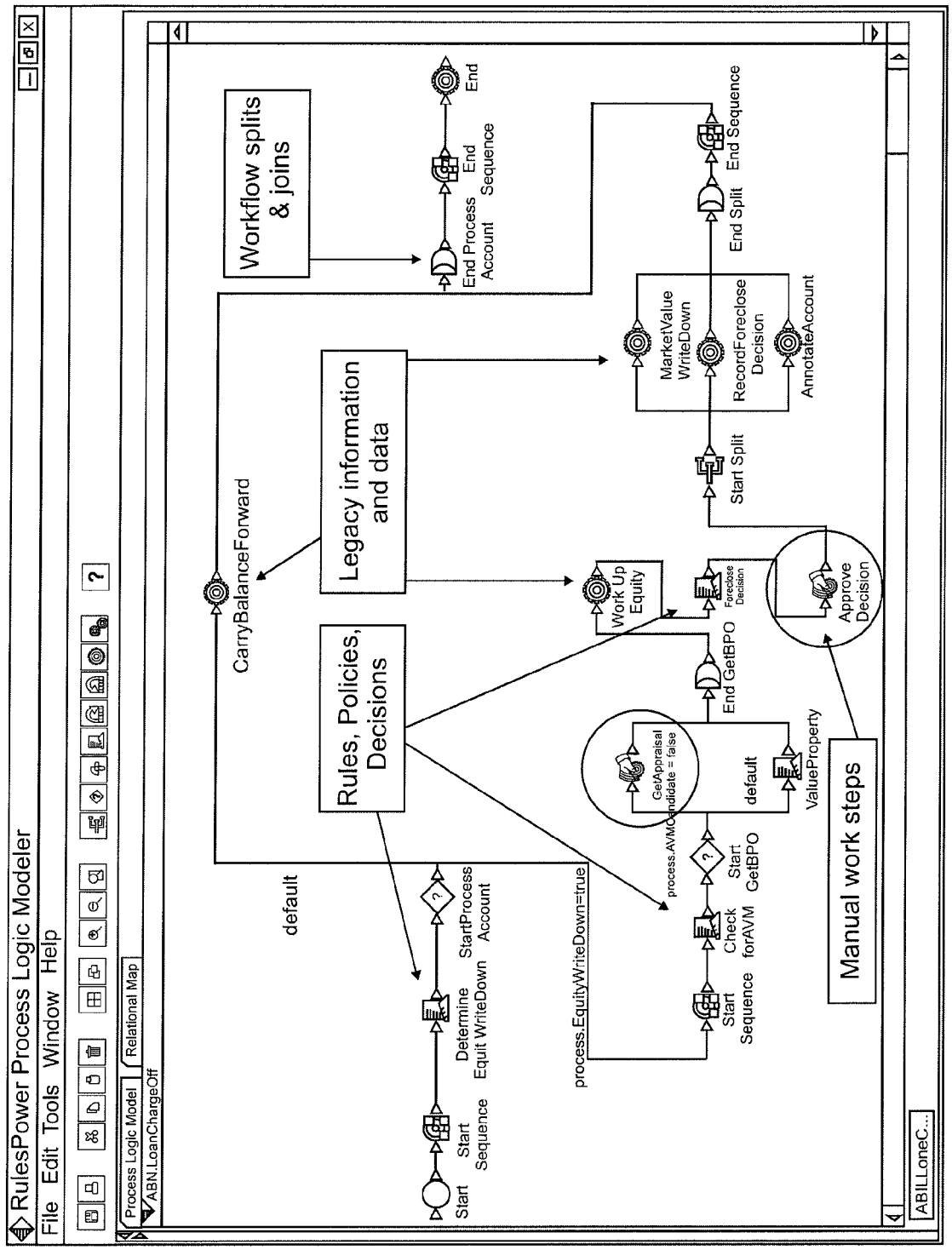
FIG. 7 is a schematic diagram of an asset valuation business model created using an illustrative embodiment of the invention.

The computer code used for propagating these relationships between rule sets and workflow steps can be complicated by the fact that there can be many execution paths through a given business process model. A more complex business model relating to asset valuation in a consumer lending context is illustrated using the RLMS' modeler in FIG. 7. In FIG. 7, from the start point to the end point, data is passing through multiple branches and decision points and subject to different policies prior to reaching the end of the model. Manual work steps are included. Additionally, FIG. 7 illustrates that data can be entering the business model from existing legacy databases and other external sources of data. Some of the complexity of the model arises because of all of the different locations where data is entering the model and being processed. The RLT is designed to take this into account.

When relations are propagated forward or backward, the system identifies (a) decision points, (b) join points, and (c) parallel paths through the model. The RLT code traces through every possible path, determining the effect of each path on the relations, and then combining the effects into a joint result. As a simple example, suppose there is a choice point that creates two possible paths of execution, and suppose that variable X is set on one path, but not set on the other.

At the point where these two paths of execution come together, the RLT system will combine the relations on X, to give the result that X is possibly (as opposed to definitely) set at that point.

To insure that inputs are available, the constraint-checking portions of the RLMS can, for each node in the graph, walk backward from that node, following every possible path, to determine which variables are defined and which are possibly defined. It compares those definitions to the input requirements of the node, and reports problems.

The logic for determining which variables are defined at any point is straightforward. Assume "A" indicates that A is defined and "(A)" indicates that A is possibly defined. Some exemplary logic relations for use with the RLMS include, but are not limited to:

If A is defined before a node, then A is defined after the node.

If A is set by a node, it is defined after that node.

If (A) is set by a node, and A is not definitely defined before the node, then (A) is defined after the node.

If a split-join section exists in a process or workflow step, the level of definition of A after the join is the highest level of definition of A on any path. That is, where "+" represents OR;

[A+A→A]

[A+(A)→A]

[A+empty→A]

[(A)+(A)→(A)]

[(A)+empty→(A)]

[empty+empty→empty]

If a decision-join section exists, then the definition level of A after the join is the AND of the definition levels computed for the individual paths, where AND is defined by:

[A*A→A]

[A*(A)→(A)]

[(A)*(A)→(A)]

[A*empty→(A)]

[(A)*empty→(A)]

[empty*empty→empty]

To insure that outputs are used, the program proceeds forward from each node, checking whether the outputs from that node are used later. Some error conditions that can be detected in response to certain inputs include, but are not limited to:

If A is required, and neither A nor (A) is available, then error.

If A is required, and only (A) is available, possible error.

If A is possibly required, and only (A) is available, possible error.

If A is possibly required, and neither A nor (A) is available, possible error.

Accordingly, an error condition can also be detected for outputs. If A is set or can possibly be set by a node, and neither A nor (A) appears on any input to a succeeding node, then the system should provide a warning. This can be a text message displayed by the program or one of the visualization cues used by the interface, such as the exclamation mark indicators discussed above in FIG. 3B.

There are several ways to perform propagations. Propagating can be performed using forward or backward processes. A drill-down process that reveals child categories and a corresponding drill-up process that reveals the parent categories can also be used when propagating relations. Input completeness and output necessity can also serve as the basis for propagating relations or filtering results. Additionally, generic impact analysis can be used to discern the location being affected. Specific what-if analysis can be used to determine how a given relationship will be affected.

In one embodiment, performing relationship propagations uses a logical system. Typically, a multi-valued logic is used. For a given relation, at any point in the model, the relation may be true, false, or possibly-true. A predicate is an operator that allows a particular statement to be made in response to an operand, such as a variable, rule, or relation. Thus, if the statement of interest, is the "account is in arrears." The account is the operand or variable and "is in arrears" is the predicate. This can be written in the form P(operand). If A is the particular variable or other RLMS element we can designate the relation by P(A)=true, P(A)=false, P(A)=unknown (possibly-true), respectively. In an exemplary set of logic, operations AND ("*") and OR ("+") are defined according to the following relationships:

true*true->true
true+true->true
false*false->false
false+false->false
false*true->unknown
false+true->true
unknown*unknown->unknown
unknown+unknown->unknown
true*unknown->unknown
true+unknown->true
false*unknown->unknown
false+unknown->unknown Although these relations are used within components of the RLMS system, the modeling of business process typically includes concrete categories of business logic. Some exemplary business logic categories suitable for use with the RLMS are shown in FIG. 8.

Figure 9:
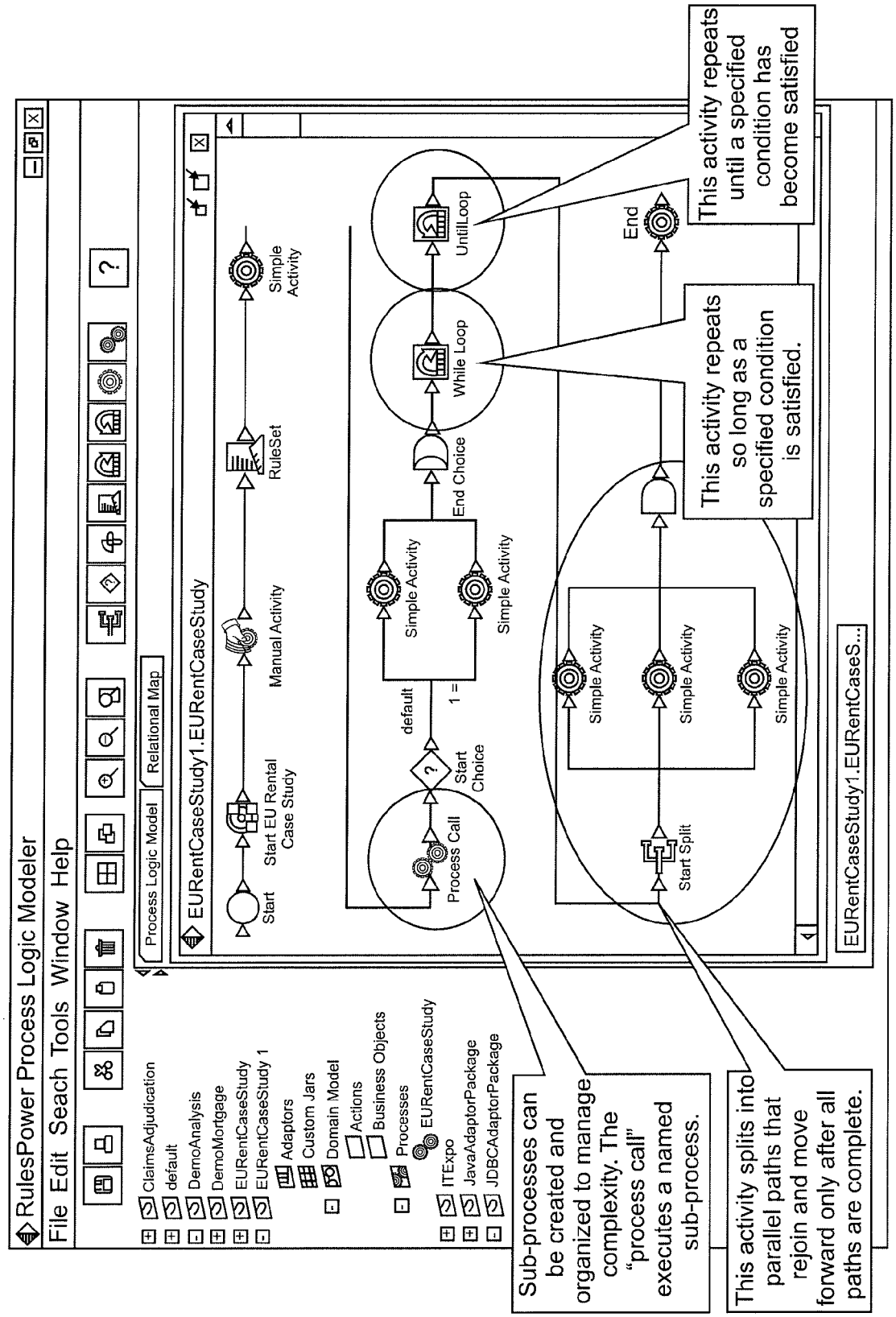
FIG. 9 is schematic diagram of a car rental business process illustrating various activities and sub-processes according an illustrative embodiment of the invention.

In a graph, there are several execution types that are typically encountered. FIG. 9 is a business model describing portions of a car rental company's operation. The business model illustrated in FIGS. 7 and 9 illustrates some of the more common execution types. The common types include sequential execution, parallel execution, and mutually-exclusive execution. Sequential execution describes how predicates are handled when control passes through a node in the graph. Parallel execution relates to the split-join construct in the graph that specifies how control passes down every path between the split and join. The join is the point in the graph where the parallel paths come back together, and control continues down a single path. That is when control passes through the join node, parallel execution specifies how predicates are handled. Mutually-exclusive execution describes the decision-join construct in the graph. This type of execution specifies how control passes through exactly one of the paths between the decision and the join node. The RLMS has a number of approaches for handling these types of execution.

The logic in incorporated in the RLMS for handling these cases in one embodiments is as follows:

Sequential execution: For predicate A:
If the node does not change A, then A has the same value after the node as before the node.
If the node makes A true, then P(A)=true after the node.
If the node makes A false, then P(A)=false after the node.
If the node possibly makes A true, and P'(A) is the value of the predicate before the node, then P(A)=[P'(A)+ unknown] after the node.
If the node possibly makes A false, and if P'(A) was the value of the predicate before the node, then after the node, P(A)=false if P'(A)=false, and P(A)=unknown otherwise.

Parallel execution: After the join node, P(A) is the OR of all the values of A produced by the parallel paths.

Mutually-exclusive execution: After the join node, P(A) is the AND of all the values of A produced by the parallel paths.

It is also desirable to propagate some predicates backward through the workflow graph. The same logic is used for backward propagation of predicates. Backward propagation is useful, for example, to determine whether a variable set at a certain node is used after it is set.

Some nodes in the workflow graph contain ordinary executable code. A flow graph can be constructed for that code, and the predicates handled the same way in the flow graph as they are in the workflow graph. A set of rules can be handled like a set of ordinary if-then statements. The code for characterizing and analyzing relationships at runtime is simpler because it does not have to deal with alternative possible paths. On each given execution of the system, only one alternative is taken.

The propagation also includes criteria for handling various types of loops, branches, and other structures that can appear. Examples of these types of connectors are shown in FIG. 9. For example, in a loop, such as a "do while" loop, the system can proceed through the loop one time in order to determine the definitions and relationships of variables. For example, in a loop in which some task is done while one variable is less than a defined amount and is incremented through the loop, that value is still defined, regardless of how many times the process circulates through the loop.

The system thus proceeds from node to node to identify each relationship, and to prepare a report on the workflow. This report can identify rules that are in conflict, the use of undefined variables, or other situations that can cause errors, assist with debugging, or other management of the workflow. In one embodiment, the system can determine, for each of the variables, whether those variables are defined throughout the flow, or whether there are undefined paths. As a further addition, the system can determine that if a value defined for a particular variable is increased or decreased, the direction (increase or decrease) in other variables that use that value. For example, the system could determine that as the prime interest rate decreases, what is the impact of other variables. In still another application of propagation techniques, the value of a variable can be stepped up or down to try to determine the change in other variables as a result of the change in a particular variable or constant. In essence, this is analogous to determining a partial derivative within the workflow.

Sets of definitions for interrelating various variables in the RLMS can also be used. For example, using the example regarding mortgage financing discussed above, the system can define that at the time that a loan is taken out, the house value is the sum of the loan amount and the downpayment, and that downpayment equals equity. For the time period after the determination of the original loan amount, the equity can be defined as the assessed value minus the outstanding loan amount. A change in downpayment will be detected as a change in the equity requirements. This information might be used for home equity credit lines.

To use a more generic example, if it is known that A+B=C and that C is a constant, the RLMS can look at changes in A and determine that there is an offsetting change in B which may be used to identify conflicts or collisions in rules in different rule sets used in different departments.

The ideal of propagation as set out in one embodiment of the invention includes the use of logical relationships and a set of logic tables to establish whether certain values are true, false, or unknown from node to node. Additionally, in this embodiment paths are propagated through many paths, preferably all available paths in both the forward and reverse direction in order to identify relationships, highlight problems, and prepare analysis of the workflow.

Implementing new business logic in a BPMS can require close interaction between a business analyst, who understands the logic to be implemented, and programmers who are responsible for specifying logic in a formal computer language. A suitable rules engine is typically selected that natively executes both inference rules and data rules, enabling ease of use and flexibility across the broad range of business problems encountered in organizations. Additionally in some embodiments, the logical processing of the engine automatically prompts application software and people when a business process needs to be completed.

However, even when an existing sub-process is being adapted to a new environment, many steps can be necessary to make the sub-process work in the new context. Pre-modeled sequences of business information and logic enable business analysts to perform tasks that previously required a programmer. This aspect of the invention facilitates the quick development of business models by the parties most directly involved in the day to day operation of the company.

A business analyst can select a chunk from a library and drop a graphical representation of the chunk into a business process. The RLMS can automatically perform complex tasks involved in making the chunk work in this new environment. The RLMS can add input and output code to the sequence, if necessary, and even modify the internals of the chunk if necessary.

Using chunks in this way provides several important benefits: new business logic can be implemented more quickly than with prior methods, and at less cost; because much of the complex logic required to adapt an existing fragment of logic is automated, many human errors can be avoided; and the existence of chunk libraries creates an incentive for users to write reusable chunks. An exemplary chunk is shown in FIG. 7 that is represented by the elements disposed between the start sequence and end sequence blocks.

Although a chunk is broadly described as a piece or sequence of information that is reusable by a component of the RLMS, an exemplary "chunk" can also include a sequence of workflow steps, rule sets, and combinations of other chunks. In one embodiment of the invention, every chunk has the following properties:

The sequence has one input and one output.

The sequence is transparent in that all of the individual steps in the sequence, and all of the variables used in the sequence are visible (not hidden as in standard component architectures).

All the relational logic information that the RLMS has for the sequence is recorded along with the sequence.

All meta-information that the RLMS has that is relevant to the sequence is recorded with the sequence.

A chunk is used to provide a unit of logic, like a module, that can be inserted into a new environment. A chunk can include one or more logical elements. This insertion of a chunk can be straightforward, but it can be complicated by a number of factors:

A new environment may use different variable names for equivalent concepts.

A new environment may use different representations for the same information. For instance, the new environment may spell out state names such as "New York" while the chunk may use abbreviations such as "NY".

The chunk may use information which is implicit, not explicit, in the new context. For instance, the chunk may require the name of a township, but the new environment may not include that. If the new environment has say a zip code, the name of the township can be determined from that.

Embodiments of the invention include a method for handling these problems. When a chunk is placed into the new environment, the information and meta-information about the variables are used to link up the variables correctly. This can be accomplished in a variety of different ways based upon the specific conditions. For example, if a variable in the new environment is equivalent to a variable in the chunk, the variable in the chunk is renamed. If a variable in the environment has a different representation from the variable in the chunk, conversion code is added to the input and output of the chunk. The information in the environment's variable is converted to and assigned to the chunk's variable at the input to the chunk. The reverse conversion and assignment is performed at the output of the chunk. Additionally, if a variable in the chunk can be derived via some process from information in the environment, the derivation process is performed at the input to the chunk, and if necessary, the process is reversed at the chunk's output.

When a chunk is put into a new environment, the user has a choice of whether to maintain or sever a logical connection with the original chunk. If the connection is maintained, any changes that may be subsequently made to the original chunk are automatically propagated to the chunk in the new environment. For example, if a formula is modified to change the way a variable is determined for one set of rules, that modification can be propagated to other areas. This dependency thus makes a chunk different from a simple template.

When changes are propagated from the original chunk, the system may have to perform mapping operations analogous to those performed when the chunk was originally inserted into the new environment. The system keeps all the information it originally created when the chunk was first inserted. Any variables that were handled in the original insertion operation, and which still have the same information and meta-information as they had before, are handled just as they were previously. Any new variables and any variable which has had a change in its information or meta-information are processed again using the mapping process described above.

A chunk should be made persistent so that it can be reused. An XML schema can be developed for representing a chunk to accomplish this. Because a chunk and a process share much in common, including the top level activity and the process context data, the same process schema can be used for representing a chunk. In other words, a chunk can be seen as a lightweight process: it contains all the required elements and attributes of a process and some of the optional elements and attributes. However, since a process exists in a package and a chunk is part of a process, some package level information may be used in chunk, including package context variables, domain objects, and domain actions. As a result, this information is isolated from a package so that a chunk can be reused across different packages.

A client tool can be used to create a process independently and save it as a chunk, or a chunk can be created from an existing process. For the client tool, any activity can be selected, whether it is a simple activity or a complex activity, and saved as a chunk. Because a chunk is stored in the chunk repository (part of the logic repository in FIG. 1), it is named and provided with package information. The selected activity is analyzed, identifying all the process context variables that are used within the activity and saved in a new process structure. Furthermore, all the package level information is identified, including package context variables, domain objects, and domain actions, and saved in a new chunk definition (chunkdef) structure, which refers to the newly created process structure.

Another way to create a chunk is to select a subset of consecutive activities in a sequence activity, because they form a structure that has a single entry and a single exit. To support this, the client tool can select a subset of consecutive activities within a sequence activity and save it as a chunk. Note that a sequence activity may be nested within another sequence activity and such a selection is allowed to go across the boundaries.

Figure 10:
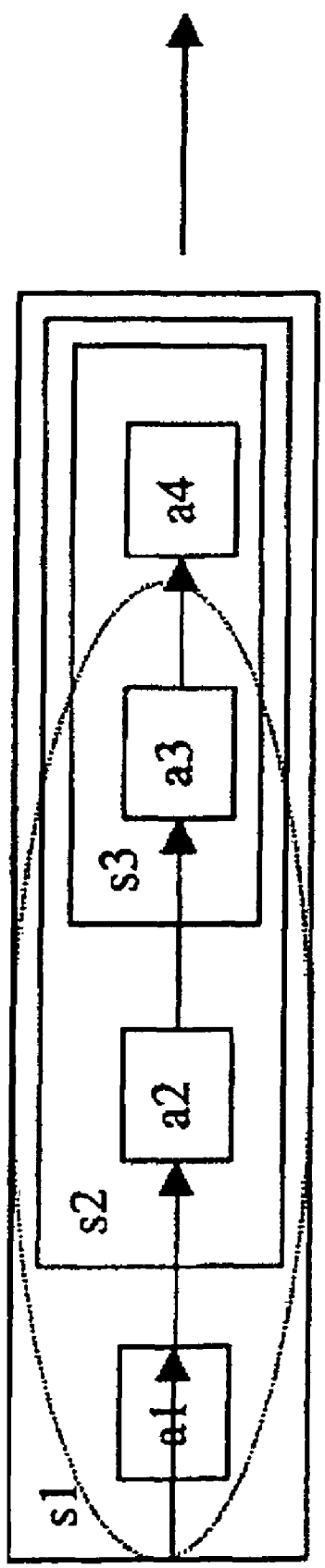
FIG. 10 is block diagram illustrating an exemplary chunk that includes a sequence of consecutive activities according to an illustrative embodiment of the invention.

As illustrated in FIG. 10, a chunk that contains a subset of consecutive activities a1, a2, and a3 can be created, even though they belong to different sequence activities, and even though sequence s3 is nested in sequence s2, which is nested in sequence s1. To create such a chunk, first, a new sequence activity which contains activities a1, a2, and a3 is created. The system then creates a new process structure that contains the sequence activity and a new chunkdef structure that refers to the new process structure.

To indicate the chunk structure in the existing process, for a chunk that contains one activity, a label can be introduced in the activity, indicating that it corresponds to a chunk in the chunk repository. However, for a chunk that contains a subset of consecutive activities, there is not one activity to attach the chunk label. Thus, for consistency, a virtual chunk structure is created to contain the related activity or activities. For a chunk that contains one activity, it is represented by a process chunk element, which contains the activity within it. For a chunk that contains a subset of consecutive activities, it is represented by a virtual process chunk element, because the subset of activities may cross different sequence activities, so it is only referred to indirectly through pointers. Multiple virtual process chunks can be created for one sequence activity, because there can be more than one subset of consecutive activities. All the virtual process chunks are attached to the sequence activity from which they were created.

XML definitions can be used as extensions to the process schema for indicating a chunk structure in the existing process. Within each chunk, a variable association interface between the context variables in the existing process and the context variables used in the chunk are included. Such information is not always necessary, but it is included in case it is desired to undo the chunk creation or reuse.

A chunk thus represents a piece of commonly-used logic that can be used repeatedly. One advantage is the ability to provide an efficient way for creating and/or expanding a process. To reuse a chunk, the context variables in the chunk are mapped to the corresponding variables in the current process so that the chunk can fit smoothly with the process. Everywhere in the process where an activity is needed, it can be filled it in with an existing chunk in the chunk repository. It can also be filled in with a process call, which establishes a connection to an existing process at the running time. A chunk is similar to a sub-process in that they both allow the reuse of common activities, but a difference is that for a sub-process, the variable mappings are handled at the running time, whereas for a chunk, the variable mappings are done at the modeling time. Thus, the chunk reuse is like a macro substitution and a sub-process reuse is like a procedure call in a traditional programming language.

Each chunk structure contains an association element which maps each context variable used in the chunk to the context variables defined in the current process context. When a chunk structure is created, the server side goes through a series of variable substitutions so that the new chunk fits with the current process. For chunk reuse, only process chunk elements are created. The virtual process chunk is a by-product of creating a chunk for a subset of activities in a sequence activity, as a way of recording the chunk itself in the existing process. Once a chunk is created and saved in the chunk repository, it can only be reused in another process as a process chunk.

Because chunks contain meaningful groupings of activities, it is useful to explore various relationships between chunks, including temporal constraints between chunks, which describe which chunks or activities are before which other chunks or activities, and the membership relationships, which indicate which variables are contained in which activities and chunks, which may be contained in other activities and chunks.

Since a chunk contains a simple or complex activity, it can also be used to specify a temporal constraint with another activity or chunk. A virtual chunk, however, should not be allowed in a temporal constraint, because all the referenced activities already exist in a process and can be used directly to specify any temporal constraint. As a result, the chunk nodes are exposed to a user for specifying temporal constraints and to validate them against the process model.

Figure 11:
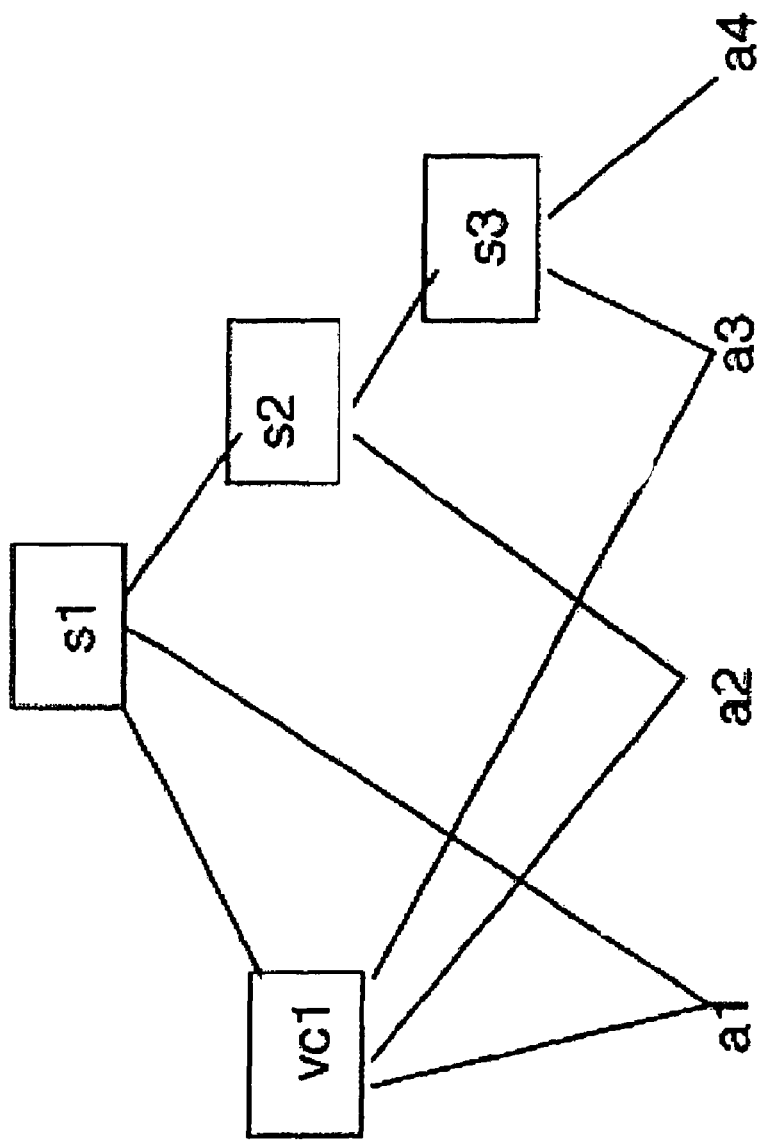
FIG. 11 is a tree graph showing a relationship among a virtual chunk, sequences, and processes according to an illustrative embodiment of the invention.

Both chunks and virtual chunks can be shown in a membership view, because they are part of the composition hierarchies and cannot be easily displayed in the workflow view of a process unless it is drilled down level by level in a crowded window. For a single process, all the activities and chunks can be shown in a tree structure. FIG. 11 shows the membership view of the sequence activity along with a virtual chunk.

As chunks are continuously created, there will be many chunks in the repository. One desirable task is to examine the membership relationships among different chunks to determine which chunks are used in which other chunks. Such relationships are different from those for processes in that there are often multiple hierarchies; most of the interest is on chunks rather than activities; and certain chunks may be used repeatedly in other chunks. Consequently, graphs are implemented for the membership relationships among different chunks in the chunk repository.

The methods and systems described herein can be performed in software on general purpose computers, servers, or other processors, with appropriate magnetic, optical or other storage that is part of the computer or server or connected thereto, such as with a bus. The processes can also be carried out in whole or in part in a combination of hardware and software, such as with application specific integrated circuits. The software can be stored in one or more computers, servers, or other appropriate devices, and can also be kept on a removable storage media, such as a magnetic or optical disks.

In one embodiment, the invention can connect to various external repositories and applications through suitable adaptors. Suitable adaptors can be provided to support the following standard interfaces: Java classes, Enterprise Java Beans (EJB), Web Services (WSDL, UDDI & SOAP), Java Database Connectivity (JDBC), Java Messaging Service (JMS), and combinations thereof. Other suitable standard interfaces can be used as known to those of ordinary skill in the art.

It should be appreciated that various aspects of the claimed invention are directed to portions of the systems described, the methods and the processes of the RLMS disclosed herein.

Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. A method for propagating relations between a first business parameter and a second business parameter wherein the first and second business parameters are invoked by a common workflow model, the method being implemented by one or more data processors and comprising:
   generating a map organized at hierarchical levels and providing a view of relationships between the first business parameter, the second business parameter, and other business parameters;
   integrating the first business parameter and the second business parameter using the common workflow model;
   tracing, by at least one data processor, paths along a first direction through the common workflow model from the first business parameter to the second business parameter;
   automatically enumerating, by at least one data processor, relations that extend along the first direction from the first business parameter to the second business parameter;
   using, by at least one data processor, multi-valued logic to compute the effects on the relations of control flow through the workflow model from the first business parameter to the second business parameter; and
   providing visual feedback in a graphical user interface to enable reconciliation of conflicts, redundancies and/or overlaps between the first business parameter to the second business parameter within the common workflow model;
   wherein the first business parameter and the second business parameter utilize conflicting terminology or rules and the common workflow model creates a format that allows interoperability between the first business parameter and the second business parameter;
   wherein the first business parameter and second business parameter are executed at different stages of a business process defined by the common workflow model;
   wherein the first business parameter and the second business parameter are chosen from the group consisting of a workflow, a rule set, and a rule.

2. A method as in claim 1, further comprising:
   tracing, by at least one data processor, paths along a second direction through the workflow model from the second business parameter to the first business parameter;
   automatically enumerating, by at least one data processor, relations that extend along the second direction from the second business parameter to the first business parameter; and
   using multi-valued logic to compute the effects on the relations of control flow backwards through the workflow model from the second business parameter to the first business parameter.

3. The method of claim 1 wherein the first direction comprises a forward direction.

4. The method of claim 1 wherein the first direction comprises a backward direction.

5. A method for propagating relations between a first business parameter and a second business parameter wherein the first and second business parameters are invoked by a common workflow model, the method being implemented by one or more data processors and comprising:
   tracing, by at least one data processor, paths along a first direction through the workflow model of a business process from the first business parameter to the second business parameter by creating flow graphs in a user interface;
   generating a map organized at hierarchical levels and providing a view of relationships between the first business parameter, the second business parameter, and other business parameters;
   integrating the first business parameter and the second business parameter using the common workflow model;
   automatically enumerating, by at least one data processor, relations that extend along the first direction from the first business parameter to the second business parameter;
   using, by at least one data processor, multi-valued logic to compute the effects on the relations of control flow through the workflow model from the first business parameter to the second business parameter; and
   providing visual feedback in a graphical user interface to enable reconciliation of conflicts, redundancies and/or overlaps between the first business parameter to the second business parameter within the common workflow model;
   wherein the first business parameter and the second business parameter utilize conflicting terminology or rules and the common workflow model creates a format that allows interoperability between the first business parameter and the second business parameter;
   wherein the first business parameter and second business parameter are executed at different stages of a business process defined by the common workflow model;
   wherein the first business parameter and the second business parameter are chosen from the group consisting of a workflow, a rule set, and a rule;
   reconciling conflicts, redundancies and/or overlaps between the first business parameter to the second business parameter with the common workflow model.

6. A method as in claim 5, further comprising:
   tracing, by at least one data processor, paths along a second direction through the workflow model from the second business parameter to the first business parameter;
   automatically enumerating, by at least one data processor, relations that extend along the second direction from the second business parameter to the first business parameter; and using multi-valued logic, computing, by at least one data processor, the effects on the relations of control flow backwards through the workflow model from the second business parameter to the first business parameter.

7. The method of claim 5 wherein the first direction comprises a forward direction.

8. The method of claim 5 wherein the first direction comprises a backward direction.

9. A computer readable storage medium encoded with instructions, which when loaded in a computing device implements a method for propagating relations between a first business parameter and a second business parameter wherein the first and second business parameters are invoked by a common workflow model, the method comprising:
   generating a map organized at hierarchical levels and providing a view of relationships between the first business parameter, the second business parameter, and other business parameters;

integrating the first business parameter and the second business parameter using the common workflow model;

tracing, by at least one data processor, paths along a first direction through the common workflow model from the first business parameter to the second business parameter;

automatically enumerating, by at least one data processor, relations that extend along the first direction from the first business parameter to the second business parameter;

using, by at least one data processor, multi-valued logic to compute the effects on the relations of control flow through the workflow model from the first business parameter to the second business parameter; and providing visual feedback in a graphical user interface to enable reconciliation of conflicts, redundancies and/or overlaps between the first business parameter to the second business parameter within the common workflow model;

wherein the first business parameter and the second business parameter utilize conflicting terminology or rules and the common workflow model creates a format that allows interoperability between the first business parameter and the second business parameter;

wherein the first business parameter and second business parameter are executed at different stages of a business process defined by the common workflow model;

wherein the first business parameter and the second business parameter are chosen from the group consisting of a workflow, a rule set, and a rule.

10. An article as in claim 9 wherein the method further comprises:

tracing paths along a second direction through the workflow model from the second business parameter to the first business parameter;

automatically enumerating relations that extend along the second direction from the second business parameter to the first business parameter; and using multi-valued logic, computing the effects on the relations of control flow backwards through the workflow model from the second business parameter to the first business parameter.

11. The article of claim 9 wherein each business parameter is chosen from a group consisting of a workflow, a rule set, and a rule.

12. The article of claim 9 wherein the first direction comprises a forward direction.

13. The article of claim 9 wherein the first direction comprises a backward direction.

14. A computer readable storage medium encoded with instructions, which when loaded in a computing device implements a method for propagating relations between a first business parameter and a second business parameter wherein the first and second business parameters are invoked by a common workflow model the method comprising:

tracing, by at least one data processor, paths along a first direction through the workflow model of a business process from the first business parameter to the second business parameter by creating flow graphs in a user interface;

generating a map organized at hierarchical levels and providing a view of relationships between the first business parameter, the second business parameter, and other business parameters;

integrating the first business parameter and the second business parameter using the common workflow model;

automatically enumerating, by at least one data processor, relations that extend along the first direction from the first business parameter to the second business parameter;

using, by at least one data processor, multi-valued logic to compute the effects on the relations of control flow through the workflow model from the first business parameter to the second business parameter; and providing visual feedback in a graphical user interface to enable reconciliation of conflicts, redundancies and/or overlaps between the first business parameter to the second business parameter within the common workflow model;

wherein the first business parameter and the second business parameter utilize conflicting terminology or rules and the common workflow model creates a format that allows interoperability between the first business parameter and the second business parameter;

wherein the first business parameter and second business parameter are executed at different stages of a business process defined by the common workflow model;

wherein the first business parameter and the second business parameter are chosen from the group consisting of a workflow, a rule set, and a rule;

reconciling conflicts, redundancies and/or overlaps between the first business parameter to the second business parameter with the common workflow model.

15. The article of claim 14 wherein the first direction comprises a forward direction.

16. The article of claim 14 wherein the first direction comprises a backward direction.

17. A method for implementation by one or more data processors comprising:

receiving, by at least one data processor, user-generated input via a user interface capturing at least one sequence of steps and rule sets of a workflow model of a business process;

storing, by at least one data processor, the sequence of steps and rule sets as a single business logic module;

storing, by at least one data processor, relational information computed for each variable used in the sequence within the single business logic module, the relational information remaining accessible to an operator to facilitate sequence reuse; and enabling, by at least one data processor, reuse of the single business logic module for another workflow model for a different business process.

* * * * *